(12) United States Patent
Hirai

(10) Patent No.: US 10,567,624 B2
(45) Date of Patent: Feb. 18, 2020

(54) CONTROL APPARATUS, INTERCHANGEABLE LENS, CAMERA SYSTEM, AND CONTROL METHOD FOR CONTROL APPARATUS

(71) Applicant: CANON KABUSHIKI KAISHA, Tokyo (JP)

(72) Inventor: Daisuke Hirai, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/944,297

(22) Filed: Apr. 3, 2018

(65) Prior Publication Data

US 2018/0302539 A1 Oct. 18, 2018

(30) Foreign Application Priority Data

Apr. 13, 2017 (JP) ................................. 2017-079854

(51) Int. Cl.
| | | |
|---|---|---|
| H04N 5/225 | (2006.01) | |
| G03B 17/14 | (2006.01) | |
| H04N 5/232 | (2006.01) | |

(52) U.S. Cl.
CPC .......... *H04N 5/2254* (2013.01); *G03B 17/14* (2013.01); *H04N 5/23203* (2013.01); *H04N 5/23241* (2013.01); *H04N 5/23258* (2013.01); *G03B 2217/005* (2013.01); *G03B 2217/007* (2013.01)

(58) Field of Classification Search
CPC ............ H04N 5/2254; H04N 5/23258; H04N 5/23241; G03B 17/14
See application file for complete search history.

(56) References Cited

U.S. PATENT DOCUMENTS

| | | | | |
|---|---|---|---|---|
| 2010/0046085 A1* | 2/2010 | Yumiki | .................. | G02B 7/102 359/684 |
| 2012/0026348 A1* | 2/2012 | Yun | .......................... | G03B 7/26 348/208.4 |

FOREIGN PATENT DOCUMENTS

| | | |
|---|---|---|
| JP | 2002267685 A | 9/2002 |
| JP | 2015179887 A | 10/2015 |

\* cited by examiner

*Primary Examiner* — Twyler L Haskins
*Assistant Examiner* — Angel L Garces-Rivera
(74) *Attorney, Agent, or Firm* — Rossi, Kimms & McDowell LLP

(57) ABSTRACT

A control apparatus includes a controller configured to determine whether or not an interchangeable lens is in a static image based on an angular velocity signal output from an angular velocity detector configured to detect an angular velocity of a vibration of an interchangeable lens. The control apparatus receives, from the camera body, a command that transfers the interchangeable lens to a sleep state a predetermined time after the controller determines that the interchangeable lens is in the static state. The controller prohibits the camera body from transmitting the command that transfers the interchangeable lens to the sleep state, when the controller determines that a first offset in the angular velocity signal recorded in a recorder is to be updated.

8 Claims, 3 Drawing Sheets

CONTROL APPARATUS, INTERCHANGEABLE LENS, CAMERA SYSTEM, AND CONTROL METHOD FOR CONTROL APPARATUS

BACKGROUND OF THE INVENTION

Field of the Invention

The present invention relates to a control apparatus, an interchangeable lens, a camera system, and a control method for a control apparatus.

Description of the Related Art

Conventionally, a gyro sensor is generally used to detect vibrations in an image stabilization system mounted on an optical apparatus, such as a camera. A detection signal of the gyro sensor may contain a DC offset due to a temperature change and a variation over time, etc., and needs to remove the DC offset from a detection signal since it is influential to the image stabilization. Japanese Patent Laid-Open No. ("JP") 2002-267685 proposes a method for performing an offset compensation operation of a gyro sensor when a static state is detected. JP 2015-179887 proposes a method for performing calibration processing based on a temperature correction expression calculated by the temperature stored when a static state is detected and a sensor output.

The methods disclosed in JP 2002-267685 and 2015-179887 provide calibration processing when the apparatus stands still so as to accurately acquire offset. In the interchangeable lens system, the power for driving a processor, a motor, a variety of sensors in a lens is generally supplied from a camera side battery. Therefore, when the system detects a long inactive time, the camera transfers the lens to the sleep state and finally powers off the lens for energy saving.

Therefore, since the camera does not always supply the power to the lens in the interchangeable lens, the lens cannot always surely receive time-consuming calibration processing. If the lens can always receive the power supply from the camera, this problem can be solved but the battery is significantly consumed and the number of image captures reduces.

SUMMARY OF THE INVENTION

The present invention provides a control apparatus, an interchangeable lens, a camera system, and a control method for a control apparatus, which can execute offset calibration processing in a signal output from a gyro sensor while saving energy.

A control apparatus according to one aspect of the present invention includes a controller configured to determine whether or not an interchangeable lens is in a static image based on an angular velocity signal output from an angular velocity detector configured to detect an angular velocity of a vibration of an interchangeable lens. The control apparatus receives a command that transfers the interchangeable lens to a sleep state from the camera body a predetermined time after the controller determines that the interchangeable lens is in the static state. The controller prohibits the camera body from transmitting the command that transfers the interchangeable lens to the sleep state, when the controller determines that an offset in the angular velocity signal recorded in a recorder is to be updated. An interchangeable lens and a camera system including the above control apparatus also constitutes one aspect of the present invention.

A control method for a control apparatus according to another aspect of the present invention that includes a controller configured to determine whether or not an interchangeable lens is in a static image based on an angular velocity signal output from an angular velocity detector configured to detect an angular velocity of a vibration of an interchangeable lens, wherein the control apparatus receives a command, from the camera body, that transfers the interchangeable lens to a sleep state a predetermined time after the controller determines that the interchangeable lens is in the static state includes the steps of determining that an update of a first offset in the angular velocity signal recorded in a recorder, and prohibiting the camera body from transmitting the command that transfers the interchangeable lens to the sleep state.

Further features of the present invention will become apparent from the following description of exemplary embodiments with reference to the attached drawings.

DESCRIPTION OF THE EMBODIMENTS

Figure 1:
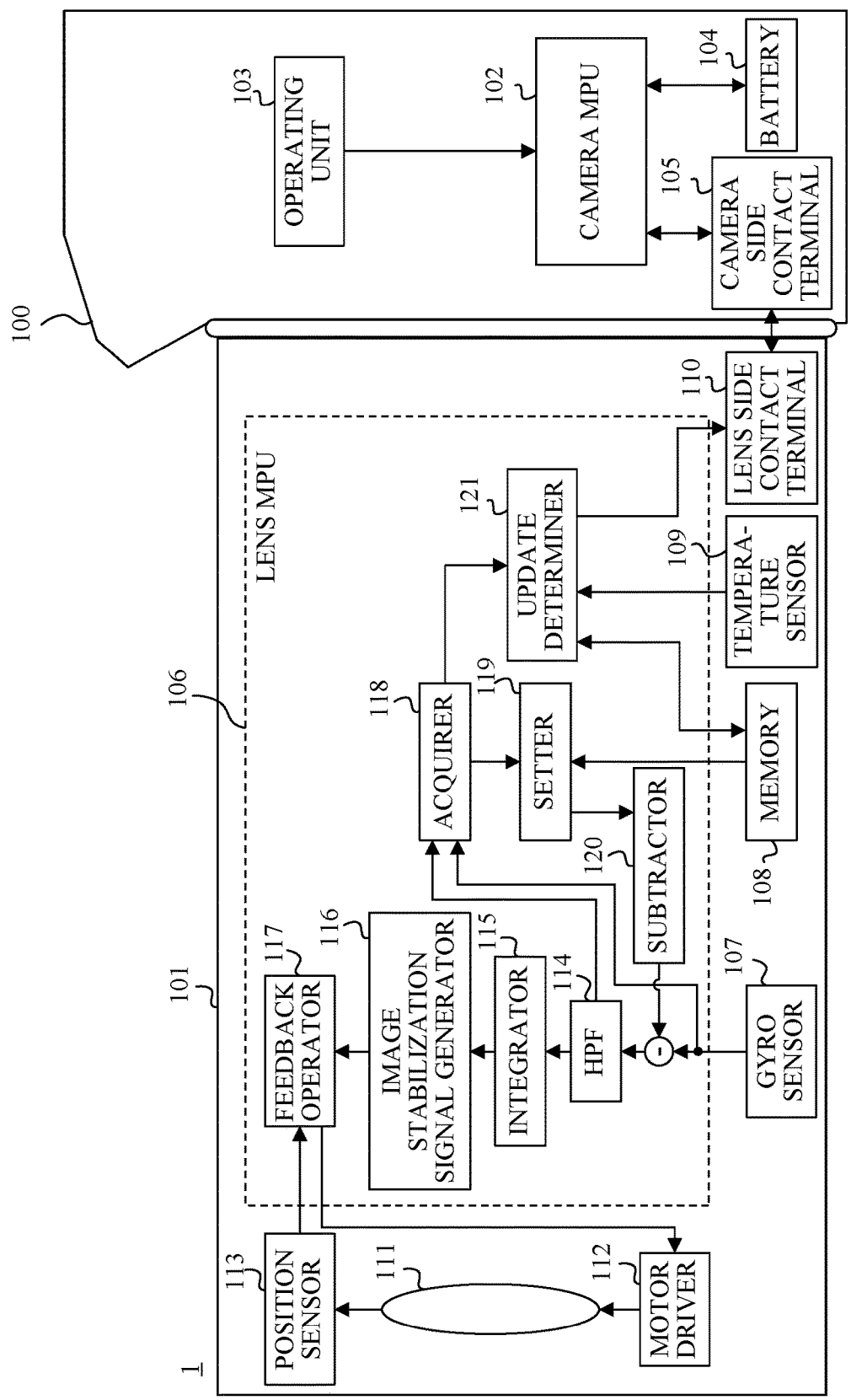
FIG. 1 is a block diagram of a camera system having an image stabilization function according to embodiments of the present invention.

Referring now to the accompanying drawings, a detailed description will be given of embodiments of the present invention. In each embodiment, corresponding elements will be designated by the same reference numerals and a description thereof will be omitted.

Referring now to FIG. 1, a description will be given of a camera system 1 having an image stabilization function according to the present invention. FIG. 1 is a block diagram of the camera system 1. The camera system 1 includes a camera body (image capturing apparatus) 100, and an interchangeable lens 101 attached to and detached from the camera body 100.

The camera body 100 includes a camera MPU 102, an operating unit 103, a battery 104, and a camera side contact terminal 105. The camera MPU 102 is a controller that provides an entire control of the camera body 100, and various processing, such as a photometry and an exposure, in accordance with a command from a user via the operating unit 103. The camera MPU 102 supplies the power from the battery 104 to the interchangeable lens 101 and receives and transmits various information with the lens MPU 106 via the camera side contact terminal 105 and the lens side contact terminal 110. Moreover, the camera MPU 102 sends to the lens MPU 106 a command (sleep state transfer state) that transfers the interchangeable lens 101 to a sleep state a predetermined time after it is determined that the camera system 1 is in the static state (non-operated or inactive state). This configuration saves the energy to the camera system 1.

The interchangeable lens 101 includes a lens MPU 106, a gyro sensor 107, a memory 108, a temperature sensor 109, a lens side contact terminal 110, an image stabilization lens 111, a motor driver 112, and a position sensor 113.

The lens MPU (controller) 106 provides a variety of controls of the interchangeable lens 101. The gyro sensor (angular velocity detector) 107 detects an angular velocity of the vibration of the interchangeable lens 101, and outputs the angular velocity signal to the lens MPU 106. The memory (recorder or storage) 108 is a nonvolatile memory configured to store various information and a (recorded) offset in the angular velocity signal output from the gyro sensor 107 acquired in the previously enforced adjustment step. The memory 108 stores the temperature detected by the temperature sensor 109 in acquiring the recorded offset. The temperature sensor 109 detects the temperature of the interchangeable lens 101, and outputs the detection result to the lens MPU 106. The lens MPU 106 processes the angular velocity signal acquired from the gyro sensor 107 for the image stabilization, and makes the motor driver 112 drive the image stabilization lens 111 while performing a feedback control by using the signal from the position sensor 113.

The lens MPU 106 includes a high-pass filter (HPF) 114, an integrator 115, an image stabilization signal generator 116, a feedback calculator 117, an acquirer 118, a setting unit 119, a subtractor 120, and a determining unit 121.

The subtractor 120 subtracts a predetermined offset set by the setting unit 119, from the angular velocity signal acquired from the gyro sensor 107. The post-subtraction angular velocity signal is input into the HPF 114. Herein, the predetermined offset is an offset read out of the memory 108 and an offset acquired by the acquirer 118.

The integrator 115 converts the angular velocity signal output from the HPF 114 into an angle signal. The image stabilization signal generator 116 calculates a gain and a phase compensation. The feedback calculator 117 provides a feedback calculation for driving the image stabilization lens 111.

The acquirer 118 acquires an offset by using the angular velocity signal output from the HPF 114 and the angular velocity signal output from the gyro sensor 107. The determining unit (controller) 121 determines whether or not the interchangeable lens 101 is in the static state. The determining unit 121 determines whether or not the recorded offset stored in the memory 108 is to be updated. When the determining unit 121 determines that the recorded offset is to be updated, the lens MPU 106 requires the camera MPU 102 not to issue the sleep state transfer command (or to prohibit the camera MPU 102 from transmitting the sleep state transfer command).

First Embodiment

Figure 2:
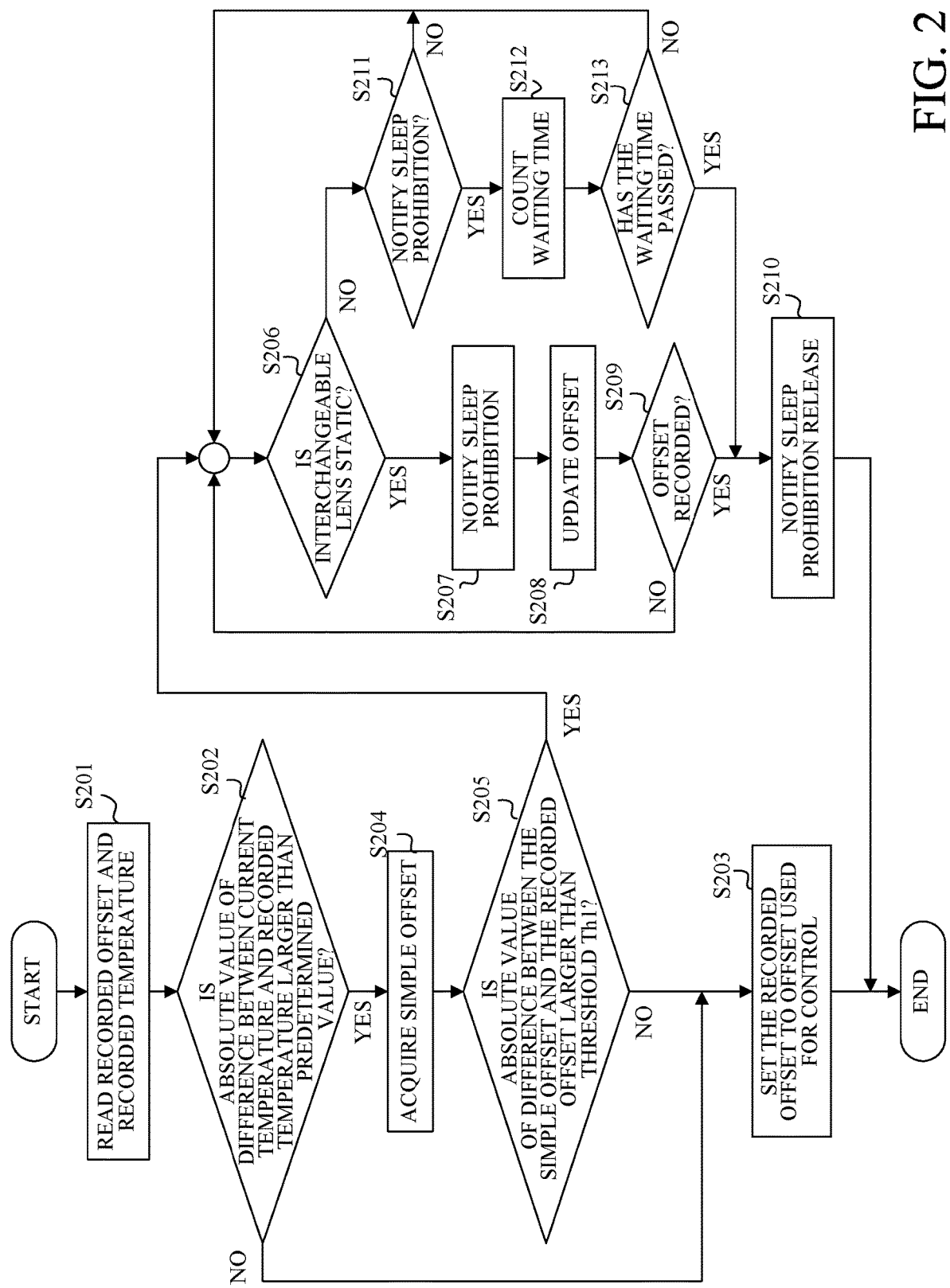
FIG. 2 is a flowchart of calibration processing according to a first embodiment.

FIG. 2 is a flowchart of offset calibration processing in an angular velocity signal output from the gyro sensor 107 according to this embodiment. The calibration processing according to this embodiment starts when the battery 104 supplies the power to the interchangeable lens 101. The calibration processing according to this embodiment is executed by a processing program as a computer program that operates on software and hardware. The processing program may be, for example, stored in the memory 108, or recorded in a computer-readable storage medium. The lens MPU 106 according to this embodiment executes the calibration processing but a personal computer (PC) and a dedicated apparatus may execute the calibration processing according to this embodiment. Alternatively, a circuit corresponding to the processing program according to this embodiment may be provided and may execute offset updating processing according to this embodiment.

In the step S201, the lens MPU 106 reads out of the memory 108 a (recorded) offset of the gyro sensor 107 acquired in the previously executed adjustment step and the temperature (recorded temperature) of the interchangeable lens 101 in acquiring the recorded offset. This processing is performed whenever the power is supplied.

In the step S202, the determining unit 121 compares the current temperature of the interchangeable lens 101 with the recorded temperature read out in the step S201. In general, the offset in the angular velocity signal output from the gyro sensor fluctuates as the temperature changes. Thus, when the current temperature is significantly different from the recorded temperature, the current offset in the angular velocity signal may fluctuate from the recorded offset. On the other hand, when the current temperature to the recorded temperature changes a little, the current offset in the velocity signal can be considered not to significantly change from the recorded offset. According to this embodiment, the determining unit 121 determines whether an absolute value of a different between the current temperature and the recorded temperature is larger than a predetermined value, such as 10° C. When the absolute value is smaller than the predetermined value, the flow moves to the step S203 and when the absolute value is larger than the predetermined value, the flow moves to the step S204.

In the step S203, the setting unit 119 sets the recorded offset to an offset used when the subtractor 120 subtracts the angular velocity signal output from the gyro sensor 107. After this processing, the lens MPU 106 ends the calibration processing.

In the step S204, the acquirer 118 acquires a simple offset based on the angular velocity signal output from the gyro sensor 107. For example, the acquirer 118 may calculate the simple offset based on the signal output from the HPF 114 such as an average value in a period in which a vibration magnitude is smaller than a predetermined value.

In the step S205, the determining unit 121 determines whether or not an absolute value of a difference between the simple offset and the recorded offset is larger than a threshold th1. When the absolute value is smaller than the threshold th1, the flow moves to the step S203, and when the absolute value is larger than the threshold th1, the flow moves to the step S206. When the absolute value is equal to the threshold th1, the flow can move to either step.

In the step S206, the lens MPU 106 determines whether the interchangeable lens 101 is in the static state. More specifically, the lens MPU 106 determines that the interchangeable lens 101 is in the static state when a time period in which the value (angular velocity) of the angular velocity signal output from the HPF 114 and smaller than the predetermined angular lasts longer than a predetermined time value. When the interchangeable lens 101 is determined to be in the static state, the flow moves to the step S207, and when the interchangeable lens 101 is determined not to be in the static state, the flow moves to the step S211. The lens MPU 106 starts counting the waiting time, which will be described later, when determining that the interchangeable lens 101 is in the static state.

When the interchangeable lens 101 is in the static state, the lens MPU 106 can accurately execute the offset calibration processing. In order to accurately acquire the offset, the interchangeable lens 101 may be in the static state and calculating the offset spends time. However, when it is determined that the interchangeable lens 101 is in the static state, the user is likely to fix the camera body 100 on the tripod or the camera system 1 is likely to be left after use. Hence, when a predetermined time passes while the camera system 1 is not operated, the camera MPU 102 sends the sleep state transfer command to the lens MPU 106 for energy saving. The lens MPU 106 makes the interchangeable lens 101 be in the sleep state when receiving the sleep state transfer command from the camera MPU 102.

In the step S207, the lens MPU 106 requires the camera MPU 102 not to issue the sleep state transfer command (to notify the camera MPU 102 of a sleep prohibition). For example, the lens MPU 106 may set one of lens status flags which the camera MPU 102 refers to. Due to this processing, the lens MPU 106 sets a sleep prohibition notification state in which the sleep state transfer command is not issued from the camera MPU 102.

In the step S208, the acquirer 118 calculates an output moving average value of the gyro sensor 107 by multiplying a predetermined time period, such as about ten seconds, after the interchangeable lens 101 is determined or detected to be in the static state. The calculated output moving average value is recorded as a new offset in addition to the current temperature of the interchangeable lens 101 in the memory 108. The setting unit 119 sets the new offset to the offset used when the subtractor 120 subtracts the angular velocity signal output from the gyro sensor 107.

In the step S209, the lens MPU 106 determines whether the new offset is recorded in the memory 108. When it is recorded, the flow moves to the step S210 and when it is not recorded, the flow returns to the step S206. In the step S206, whether the interchangeable lens 101 is in the static state is again determined. This is because the calibration processing needs to spend time and the interchangeable lens 101 may not be in the static state in the processing.

In the step S210, the lens MPU 106 notifies the camera MPU 102 of a release of the sleep prohibition notice (sleep prohibition release notice). If, for example, the step S207 sets the lens status flag which the camera MPU 102 refers to, the flag may be cleared. Due to this processing, the camera MPU 102 sends the sleep state transfer command to the lens MPU 106. After this processing, the lens MPU 106 ends the calibration processing.

In the step S211, the lens MPU 106 determines whether or not the sleep prohibition notice has been issued to the camera MPU 102. When the sleep prohibition notice has been issued, the flow moves to the step S212. When the speed prohibition notice has not yet been issued, the flow returns to the step S206. In this case, when the camera MPU 102 issues the sleep state transfer command to the lens MPU 106, the lens MPU 106 promptly transfers the interchangeable lens 101 to the sleep state.

In the step S212, the lens MPU 106 counts the waiting time.

In the step S213, the lens MPU 106 determines whether the counted value of the waiting time is larger than the predetermined value (or whether the predetermined waiting time has passed). When the predetermined waiting time has passed, the flow moves to the step S210 and when the predetermined waiting time has not yet been passed, the flow returns to the step S206. In other words, the lens MPU 106 maintains the sleep prohibition notice state in which the camera MPU 102 does not issue the sleep state transfer command until the predetermined waiting time passes. This is because the interchangeable lens 101 vibrates from the static state is likely to be again in the static state since this vibration is often caused by the user's camera operation and the static state is temporarily broken.

As described above, when this embodiment determines that the offset of the gyro sensor 107 is to be updated and detects the static state suitable for the offset acquisition, the camera MPU 102 does not issue the sleep state transfer command. This configuration can prevent the interchangeable lens 101 from transferring to the sleep state before the calibration processing ends, and enables the offset to be accurately acquired. When the offset is not to be updated or when the static state cannot be detected, the sleep state transfer command from the camera MPU 102 enables the interchangeable lens 101 to promptly transfer to the sleep state for energy saving.

Second Embodiment

Figure 3:
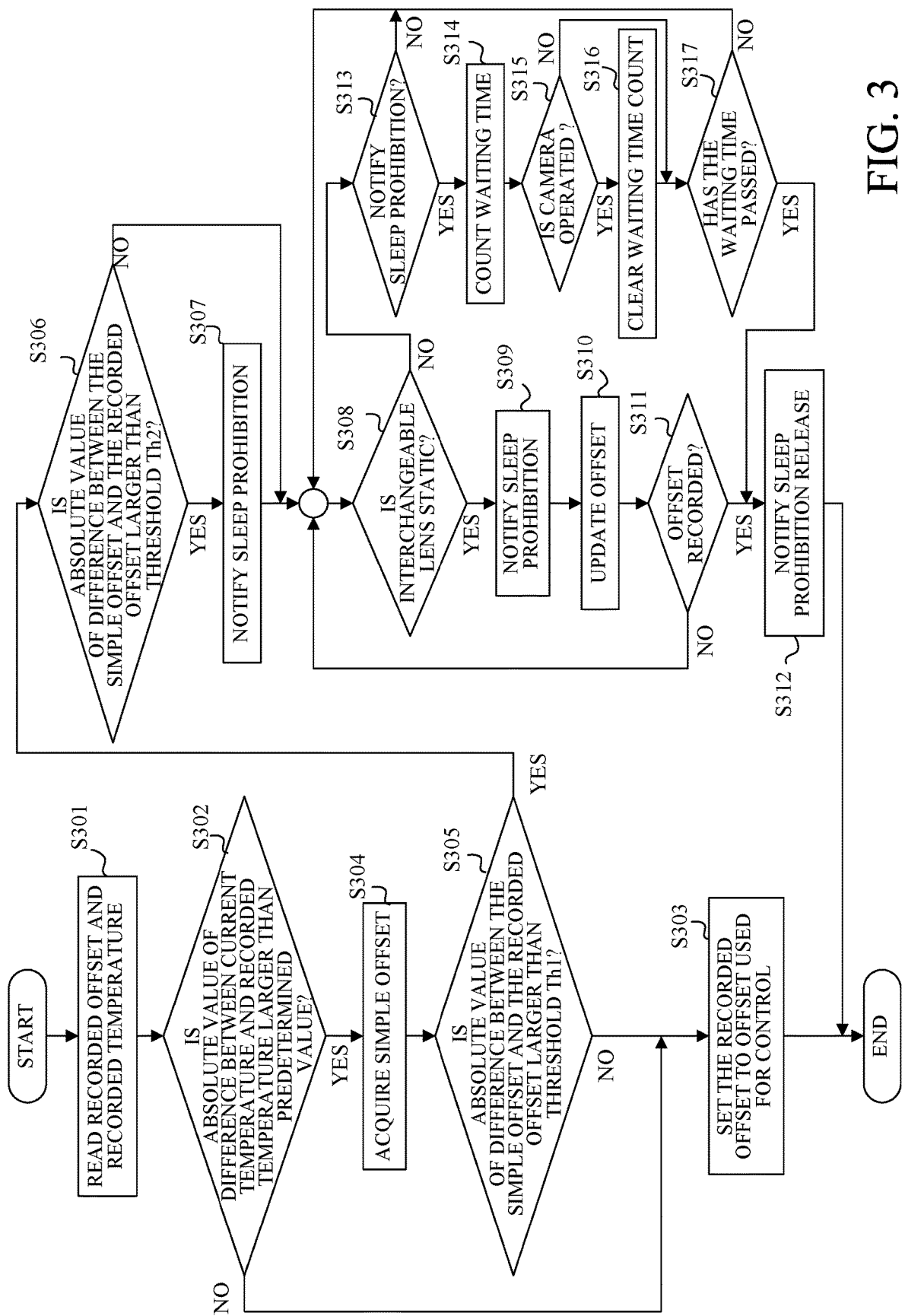
FIG. 3 is a flowchart of calibration processing according to a second embodiment.

FIG. 3 is a flowchart of calibration processing according to this embodiment. The calibration processing according to this embodiment is different from that in the first embodiment in timing when the sleep prohibition notice is sent to the camera MPU 102.

The steps S301 to S305 are similar to the steps S201 to S205 in the first embodiment, and a detailed description thereof will be omitted.

In the step S306, the determining unit 121 determines whether an absolute value of a difference between the simple offset and the recorded offset is larger than a threshold th2 (larger than threshold th1). When the absolute value is larger than the threshold th2, the flow moves to the step S307, and when the absolute value is smaller than the threshold th2, the flow moves to the step S308. When the absolute value is equal to the threshold th2, the flow can move to either step.

In the step S307, the lens MPU 106 provides the camera MPU 102 with the sleep prohibition notice.

The steps S306 and S307 are executed so as to change the offset updating necessity level in accordance with the reliability of the offset stored in the memory 108. In this embodiment, when the offset updating necessity is high, the lens MPU 106 provides the camera MPU 102 with the sleep prohibition notice irrespective of whether the interchangeable lens 101 is in the static state. Thereby, even when the user does not operate the camera system 1, the lens MPU 106 does not transfer to the sleep state. Hence, it is likely to detect the time when the user ends image capturing and the camera system 1 leaves the camera system.

The steps S308 to S312 are similar to the steps S206 to S210 in the first embodiment, and a detailed description thereof will be omitted.

In the step S313, the lens MPU 106 determines whether the sleep prohibition notice has been sent to the camera MPU 102. When the sleep prohibition notice has been set, the flow moves to the step S314, and when the sleep prohibition notice has not been set the flow moves to the step S308.

In the step S314, the lens MPU 106 counts the waiting time.

In the step S315, the lens MPU 106 determines whether the user has operated the camera system 1. When the user has operated the camera system 1, the flow moves to the step S316, and when the user has not operated the camera system 1 the flow moves to the step S317.

In the step S316, the lens MPU 106 clears the counted value of the waiting time. Thereby, the user can accurately detect that the predetermined time has passed after the user's non-operation of the camera system 1 is detected.

In the step S317, the lens MPU 106 determines whether the counted value of the waiting time is larger than the predetermined value (or whether the predetermined waiting time has passed). When the predetermined waiting time has passed, the flow moves to the step S312, and when the predetermined waiting time has not passed the flow returns to the step S308.

As described above, this embodiment determines the necessity level of the recorded offset update of the gyro sensor 107. When the level is high, the camera MPU 102 is prevented from issuing the sleep state transfer command and the static state suitable for the offset acquisition can be easily detected.

While this embodiment determines the offset update necessity level based on determining whether the absolute value of the difference between the simple offset and the recorded offset is larger than the threshold th2, the present invention is not limited to this embodiment. For example, the camera system 1 may set an energy saving priority mode or a performance priority mode, and the update necessity level may be set high in the performance priority mode.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-079854, filed on Apr. 13, 2017, which is hereby incorporated by reference herein in its entirety.

What is claimed is:

1. An interchangeable lens which is detachably attachable to a camera body, the interchangeable lens comprising:
a controller configured to:
perform an image stabilization based on a signal generated using a first offset stored in a memory and an angular velocity signal output from an angular velocity detector, the angular velocity detector configured to detect an angular velocity of the interchangeable lens;
determine whether the first offset is to be updated; and
prohibit the camera body from transmitting the command that transfers the interchangeable lens to the sleep state, when the controller has determined that the first offset is to be updated,
wherein the controller determines that the first offset is to be updated when an absolute value of a difference between the first offset and a second offset in the angular velocity signal is larger than a threshold, the second offset acquired when an absolute value of a difference between a temperature of the interchangeable lens when the first offset is acquired and a current temperature of the interchangeable lens is larger than a predetermined value.

2. The interchangeable lens according to claim 1, wherein the controller is configured to determine whether the interchangeable lens is in a static state based on the angular velocity signal and to prohibit the camera body from transmitting the command that transfers the interchangeable lens to the sleep state, when the controller has determined that the first offset is to be updated and that the interchangeable lens is in the static state.

3. The interchangeable lens according to claim 1, wherein the controller is configured to determine whether the interchangeable lens is in a static state based on the angular velocity signal and determine an update necessity of the first offset, wherein the controller is configured to prohibit the camera body from transmitting the command that transfers the interchangeable lens to the sleep state no matter whether the controller has determined that the interchangeable lens is in a static state, when the controller has determined that the first offset is to be updated and that the update necessity is high.

4. The interchangeable lens according to claim 3, wherein the controller determines that the first offset is to be updated when a first absolute value of a difference between the first offset and a second offset in the angular velocity signal is larger than a first threshold, the second offset acquired when a second absolute value of a difference between a temperature of the interchangeable lens when the first offset is acquired and a current temperature of the interchangeable lens is larger than a predetermined value, wherein the controller determines that the update necessity is high when the first absolute value is larger than a second threshold which is larger than the first threshold, and the controller determines that the update necessity is low when the first absolute value is larger than the first threshold and smaller than the second threshold.

5. The interchangeable lens according to claim 3, wherein the controller is configured to prohibit the camera body from transmitting the command that transfers the interchangeable lens to the sleep state after the controller has determined that the interchangeable lens is in the static state, when the controller has determined that the first offset is to be updated and that the update necessity is low.

6. A camera system comprising:
an interchangeable lens according to claim 1; and
a camera body configured to capture an image, the interchangeable lens being attached to and detached from the image capturing apparatus.

7. A control method for an interchangeable lens which is detachably attachable to a camera body and configured to perform an image stabilization based on a signal generated using a first offset stored in a memory and an angular velocity signal output from an angular velocity detector, the angular velocity detector configured to detect an angular velocity of the interchangeable lens, the control method comprising the steps of:

determining whether the first offset is to be updated; and prohibiting the camera body from transmitting the command that transfers the interchangeable lens to the sleep state, when having determined that the first offset is to be updated, wherein the control method determines that the first offset is to be updated when an absolute value of a difference between the first offset and a second offset in the angular velocity signal is larger than a threshold, the second offset acquired when an absolute value of a difference between a temperature of the interchangeable lens when the first offset is acquired and a current temperature of the interchangeable lens is larger than a predetermined value.

8. A control method for a lens apparatus which is configured to perform an image stabilization based on a signal generated using a first offset stored in a memory and an angular velocity signal output from an angular velocity detector, the angular velocity detector configured to detect an angular velocity of the lens apparatus, the control method comprising the steps of:

determining whether the first offset is to be updated; and prohibiting a camera body from transferring the lens apparatus to the sleep state, when having been determined that the first offset is to be updated, wherein the control method determines that the first offset is to be updated when an absolute value of a difference between the first offset and a second offset in the angular velocity signal is larger than a threshold, the second offset acquired when an absolute value of a difference between a temperature of the interchangeable lens when the first offset is acquired and a current temperature of the interchangeable lens is larger than a predetermined value.

\* \* \* \* \*